(12) United States Patent
Hutchcraft

(10) Patent No.: US 9,937,572 B2
(45) Date of Patent: Apr. 10, 2018

(54) BLADE FAN

(71) Applicant: Wesley Harold Hutchcraft, Lebanon, TN (US)

(72) Inventor: Wesley Harold Hutchcraft, Lebanon, TN (US)

( * ) Notice: Subject to any disclaimer, the term of this patent is extended or adjusted under 35 U.S.C. 154(b) by 97 days.

(21) Appl. No.: 15/130,710

(22) Filed: Apr. 15, 2016

(65) Prior Publication Data
US 2016/0311041 A1    Oct. 27, 2016

Related U.S. Application Data

(60) Provisional application No. 62/150,898, filed on Apr. 22, 2015.

(51) Int. Cl.
*B23D 59/00* (2006.01)
*B23D 49/16* (2006.01)

(52) U.S. Cl.
CPC .......... *B23D 59/006* (2013.01); *B23D 49/162* (2013.01)

(58) Field of Classification Search
CPC .... B23D 49/007; B23D 49/008; B23D 59/00; B23D 59/006; B27B 19/00; B27B 19/002; B27B 19/004; B27B 19/008; B27B 19/09
USPC .................................................. 30/392–394
See application file for complete search history.

(56) References Cited

U.S. PATENT DOCUMENTS

| 2,522,182 | A |  | 9/1950 | Laudien |  |
| 3,747,454 | A |  | 7/1973 | Gerber |  |
| 4,550,500 | A | * | 11/1985 | Kuhlmann | B23D 51/10 279/8 |
| 5,093,997 | A | * | 3/1992 | Gilman | B23D 49/002 30/298 |
| 5,772,367 | A |  | 6/1998 | Daniel |  |
| 6,189,217 | B1 | * | 2/2001 | Melvin | B23D 51/03 30/125 |
| 6,574,873 | B2 | * | 6/2003 | Kordyak | B23D 59/00 30/310 |
| 7,430,807 | B2 | * | 10/2008 | Saegesser | B23D 49/167 30/122 |
| 8,112,895 | B2 | * | 2/2012 | Rakaczki | B23D 51/10 30/392 |
| 8,161,655 | B2 | * | 4/2012 | Fuchs | B23D 51/02 30/392 |
| 8,732,962 | B2 | * | 5/2014 | Laett | B23D 59/006 30/392 |
| 8,776,383 | B2 | * | 7/2014 | Sergyeyenko | B23D 49/162 30/371 |
| 8,826,548 | B2 | * | 9/2014 | Kaiser | B23D 49/167 144/154.5 |
| 9,038,277 | B2 | * | 5/2015 | Steele | B23D 49/167 30/371 |
| 2007/0169606 | A1 | * | 7/2007 | Bone | B23D 49/162 83/835 |

(Continued)

*Primary Examiner* — Jason Daniel Prone
*Assistant Examiner* — Richard Crosby, Jr.
(74) *Attorney, Agent, or Firm* — Shane Cortesi

(57) ABSTRACT

An accessory for a cutting blade, more particularly, to a flexible plate that attaches to the blade and blows debris when the plate reciprocates up and down with the blade is described. The plate may be thin so that the plate bends/flaps as the blade (and attached plate) moves up and down. The plate may include a slit so that the plate removably attaches to the blade via a friction fit and the plate is transparent so that the plate does not block the operator's view.

19 Claims, 2 Drawing Sheets

(56) References Cited

U.S. PATENT DOCUMENTS

| | | | |
|---|---|---|---|
| 2008/0222901 A1* | 9/2008 | Kaiser | B23D 49/165 30/392 |
| 2011/0185582 A1* | 8/2011 | Koeder | B23D 49/165 30/392 |
| 2012/0192439 A1* | 8/2012 | Bozic | B23D 61/123 30/392 |
| 2012/0227271 A1* | 9/2012 | Krieger | B23D 49/167 30/374 |
| 2014/0245620 A1* | 9/2014 | Fankhauser | B25F 5/001 30/374 |
| 2016/0311041 A1* | 10/2016 | Hutchcraft | B23D 59/006 |

* cited by examiner

BLADE FAN

RELATED APPLICATIONS

This application claims priority under 35 USC 119 to U.S. Provisional Application No. 62/150,898, filed Apr. 22, 2015, the entire contents of which are incorporated herein by reference.

BACKGROUND

Technical Field

The present invention relates to an accessory for a blade, more particularly, to a flexible plate that attaches to a jigsaw blade and blows debris when the jigsaw blade reciprocates up and down in order to clear the cutting surface.

Background of the Invention

As known to those of ordinary skill, jigsaw blades generate sawdust when cutting wood. As a result, operators of jigsaws usually blow the sawdust off intermittently so that they can see what they are cutting. However, blowing sawdust takes time and interrupts the operator's task of cutting of wood.

U.S. Pat. No. 2,522,182 relates to a sawdust removing attachment for a handsaw. However, this patent does not relate to a plate that is friction fit and extends widthwise and lengthwise across the blade. Also, it is not a thin blade that bends when the blade moves.

U.S. Pat. No. 5,772,367 relates to a venting apparatus that attaches to a rotating tool bit via a frictional fit. However, the venting apparatus does not move up and down or bend.

U.S. Pat. No. 3,747,454 relates to a pressing system that is adjacent to a blade for cutting cloth. The pressing system does not bend, is not friction fit, and the pressing system is not designed to move air away from the blade.

Thus, there is a continuing need for apparatuses that remove sawdust and other debris when a jigsaw or other motorized cutting tool cuts a piece of material such as wood.

BRIEF SUMMARY

The present disclosure provides a blade fan system. In some embodiments, the blade fan system includes:

a) a blade having a blade top end, a blade bottom end, a blade length extending from the blade top end to the blade bottom end, a blade front end, a blade rear end, a blade width extending from the front end to the rear end, the blade width generally perpendicular to the blade length, a blade left side, a blade right side, a blade thickness extending from the left side to the right side, the blade thickness generally perpendicular to the blade length and the blade width; and b) a transparent plate removably attached to the blade, the transparent plate having a top surface, a bottom surface, a plate thickness extending from the top surface to the bottom surface, the plate thickness generally parallel to the blade length, a front end, a rear end, a plate length extending from the front end to the rear end, the plate length generally parallel to the blade width (and generally perpendicular to the plate thickness), a left side, a right side, and a plate width extending from the left side to the right side, the plate width generally parallel to the blade thickness (and generally perpendicular to the plate thickness and plate length), wherein the transparent plate further comprises a slit extending from the plate top surface to the plate bottom surface, wherein the slit is located between the left side, right side, front end and rear end of the transparent plate, and further wherein the blade passes through the slit.

Optionally, the blade comprises a notch located at the top end of the blade. Optionally, the blade front end comprises a plurality of teeth spaced about the blade length, the plurality of teeth facing the front end of the transparent plate. Optionally, the transparent plate is located between the plurality of teeth and the top end. Optionally, the slit is generally rectangular in shape. Optionally, the slit has a length generally parallel to the plate length of between about 0.5 inches and about 0.75 inches and a width generally parallel to the plate width of between about 0.1 inches and about 0.25 inches. Optionally, the blade is frictionally attached to the transparent plate. Optionally, the slit is situated approximately in the widthwise center of the transparent plate. Optionally, the slit is offset from the lengthwise center of the transparent plate. Optionally, the slit is located between about 0.5 inches and about 1 inch from the front end of the transparent plate and between about 0.1 inches and about 0.5 inches from the rear end of the transparent plate. Optionally, the blade front end comprises a plurality of teeth spaced about the blade length, the plurality of teeth facing the front end of the transparent plate. Optionally, the plate thickness is between about 0.001 and about 0.01 inches. Optionally, the blade is a jigsaw blade. Optionally, the blade top end is connected to a motor, the motor configured to move the blade and attached transparent plate upwardly and downwardly in a reciprocating fashion. Optionally, the upward and downward movement of the blade is configured to cause the transparent plate to bend along the plate length. Optionally, the blade is configured to cut wood. Optionally, the upward and downward movement of the blade in cutting a piece of wood is configured to blow sawdust generated by cutting the piece of wood. Optionally, the transparent plate is comprised of plastic. Optionally, the plastic comprises PVC (polyvinyl chloride). Optionally, the transparent plate extends beyond the front end, the rear end, the left side and the right side of the blade.

In further embodiments, the present disclosure provides a blade fan system comprising:

a) a motorized cutting tool comprising a motor;

b) a blade attached to the cutting instrument, the blade having a blade top end, a blade bottom end, a blade length extending from the blade top end to the blade bottom end, a blade front end, a blade rear end, a blade width extending from the front end to the rear end, the blade width generally perpendicular to the blade length, a blade left side, a blade right side, a blade thickness extending from the left side to the right side, the blade thickness generally perpendicular to the blade length and the blade width;

c) a plate removably attached to the blade, the plate having a top surface, a bottom surface, a plate thickness extending from the top surface to the bottom surface, the plate thickness generally parallel to the blade length, a front end, a rear end, a plate length extending from the front end to the rear end, the plate length generally parallel to the blade width, a left side, a right side, and a plate width extending from the left side to the right side, the plate width generally parallel to the blade thickness, wherein the motor is configured to move the blade and attached plate upwardly and downwardly in a reciprocating fashion;

wherein the plate further comprises a slit extending from the plate top surface to the plate bottom surface, wherein the slit is located between the left side, right side, front end and rear end of the plate, wherein the blade passes through the slit; and further wherein the upward and downward movement of the blade is configured to cause the plate to bend along the plate length.

Optionally, the plate is only connected to the motorized cutting tool via the blade. In addition, the plate, slit, and blade may have the dimensions and characteristics described above. Optionally, the system is used in a method that includes: a) providing the blade fan system; b) providing a piece of wood; c) moving the plate and the blade upwardly and downwardly while cutting the piece of wood; d) generating sawdust during step c); and e) using the upwardly and downwardly movement of the plate to generate a current of air to blow the sawdust.

The present disclosure also provides a transparent plate comprising a top surface, a bottom surface, a plate thickness extending from the top surface to the bottom surface, a front end, a rear end, a plate length extending from the front end to the rear end, a left side, a right side, a plate width extending from the left side to the right side, and a slit extending from the plate top surface to the plate bottom surface
wherein the slit is generally rectangular in shape and comprises a length generally parallel to the plate length of between about 0.5 inches and about 0.75 inches and a width generally parallel to the plate width of between about 0.1 inches and about 0.25 inches.

Optionally, the plate thickness is between about 0.001 and about 0.01 inches. Optionally, the slit is situated approximately in the widthwise center of the transparent plate. Optionally, the slit is offset from the lengthwise center of the transparent plate. Optionally, the slit is located between about 0.5 inches and about 1 inch from the front end of the transparent plate and between about 0.1 inches and about 0.25 inches from the rear end of the transparent plate. In addition, the plate and slit may have the other dimensions and characteristics described above.

DETAILED DESCRIPTION

Figure 1:
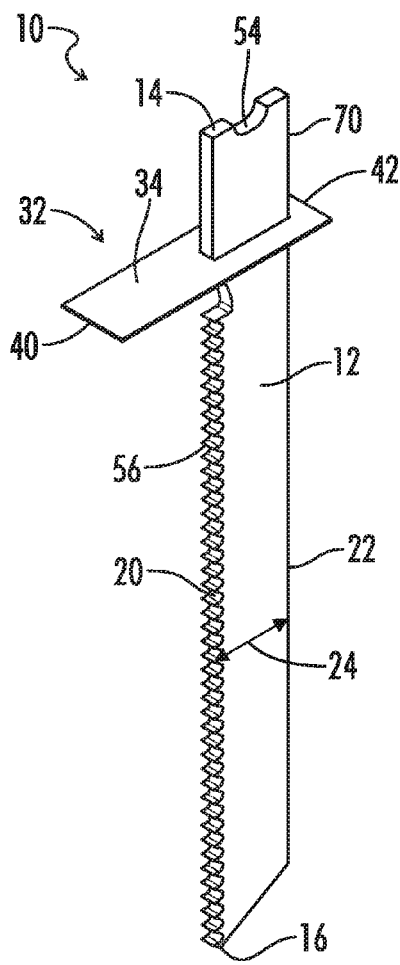
FIG. 1 illustrates an isometric view of a blade fan system of one embodiment of the present invention.
Figure 2:
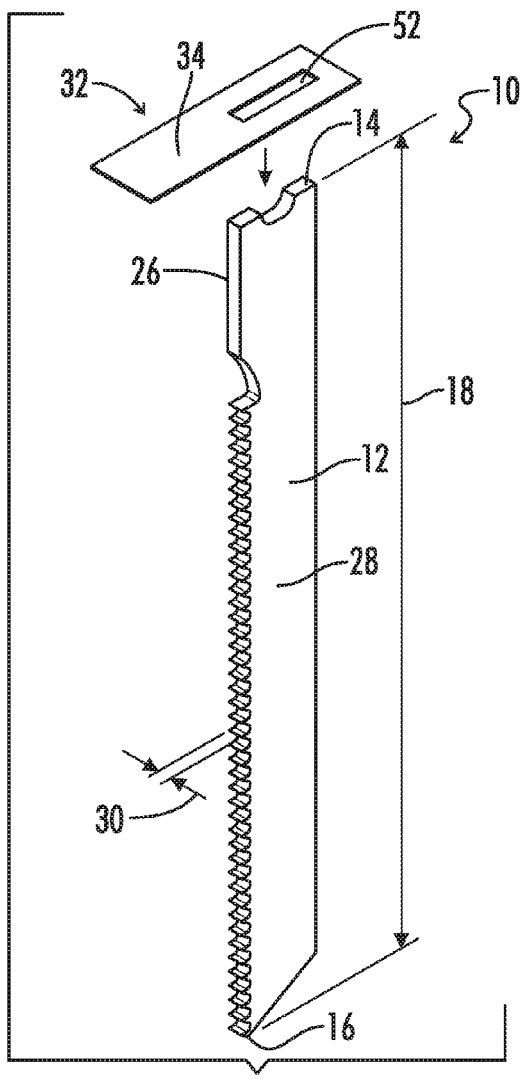
FIG. 2 illustrates an exploded isometric view of the blade fan system of FIG. 1.
Figure 3:
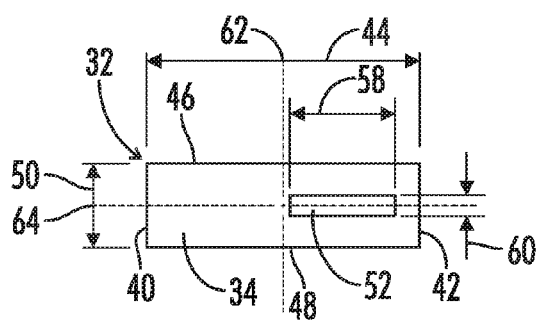
FIG. 3 illustrates a top, plan view of the plate of the blade fan system of FIG. 1.
Figure 4:
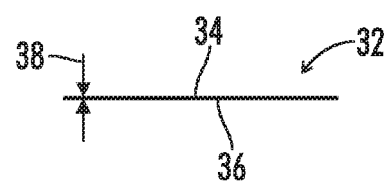
FIG. 4 illustrates a side, elevation view of the plate of the blade fan system of FIG. 1.

With reference to FIGS. 1-5 the present disclosure provides a blade fan system designated by the numeral 10. In the drawings, not all reference numbers are included in each drawing for the sake of clarity.

Referring to FIGS. 1-5, the present disclosure provides a blade fan system 10 that includes: a) a blade 12 having a blade top end 14, a blade bottom end 16, a blade length 18 extending from the blade top end 14 to the blade bottom end 16, a blade front end 20, a blade rear end 22, a blade width 24 extending from the front end 20 to the rear end 22, the blade width 24 generally perpendicular to the blade length 18, a blade left side 26, a blade right side 28, a blade thickness 30 extending from the left side 26 to the right side 28, the blade thickness 30 generally perpendicular to the blade length 18 and the blade width 24; and b) a plate 32 removably attached to the blade 12, the plate 32 having a top surface 34, a bottom surface 36, a plate thickness 38 extending from the top surface 34 to the bottom surface 36, the plate thickness 38 generally parallel to the blade length 18, a front end 40, a rear end 42, a plate length 44 extending from the front end 40 to the rear end 42, the plate length 44 generally parallel to the blade width 24, a left side 46, a right side 48, and a plate width 50 extending from the left side 46 to the right side 48, the plate width 50 generally parallel to the blade thickness 30, wherein the plate 32 further comprises a slit 52 extending from the plate top surface 34 to the plate bottom surface 36, wherein the slit 52 is located between the left side 46, right side 48, front end 40 and rear end 42 of the plate 32 and further wherein the blade 12 passes through the slit 52.

Figure 5:
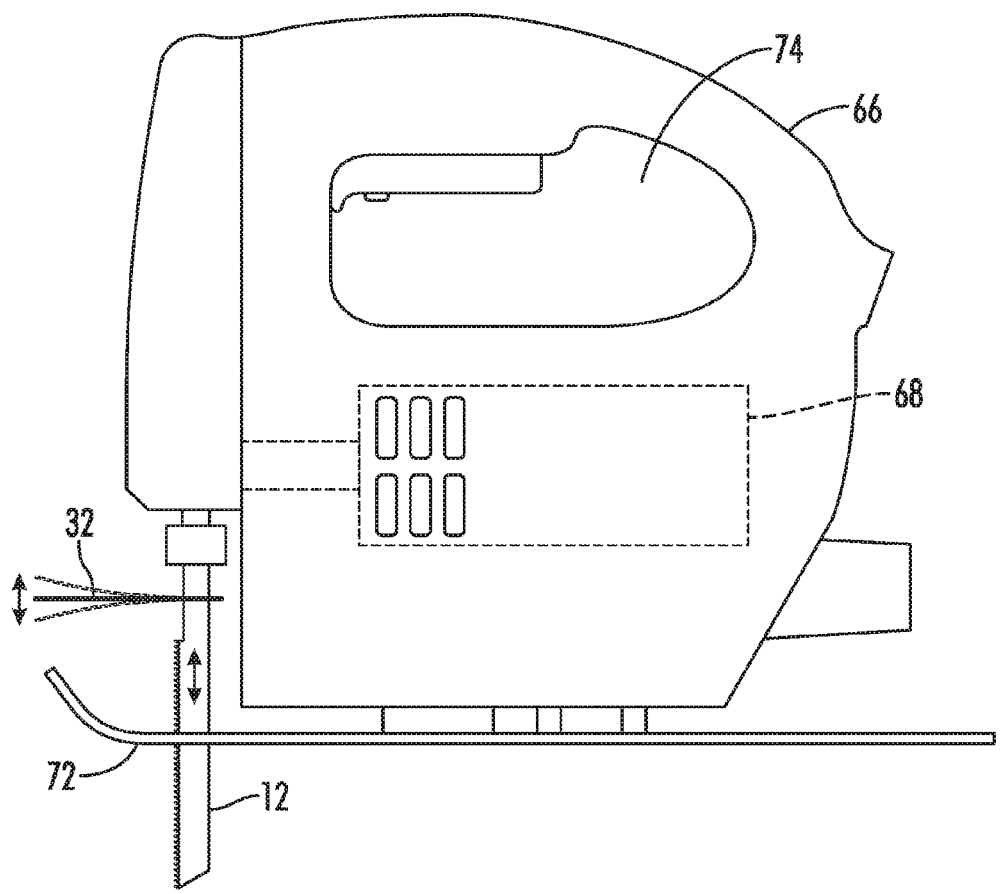
FIG. 5 illustrates a side, elevation view of the plate of the blade fan system of FIG. 1 attached to a motorized cutting tool; the arrows in the blade show how the blade moves up and down in a reciprocating fashion; the dotted lines show how the plate bends as the blade moves up and down.

Optionally, the plate 32 is attached (preferably removably attached) to a motorized cutting tool 66 (e.g., a jigsaw) that is configured to move the blade 12 (and attached plate 32) up and down in a reciprocating fashion (i.e., along an axis generally parallel to the blade length 18). Optionally, the plate 32 is transparent so that the plate 32 does not interfere with the line of sight of the operator of the cutting tool 66. Optionally, the blade 12 comprises a notch 54 located at the top end 14 of the blade 12 configured to removably attach the blade 12 to the motorized cutting tool 66. Optionally, the plate 32 is only connected to the motorized cutting tool 66 via the blade 12 so that the plate 32 is incapable of moving independently of the blade 12. Optionally, the cutting tool 66 includes a foot 72 that curves upwardly, as shown in FIG. 5. Optionally, the cutting tool 66 includes an opening 74 that acts as a handle.

Optionally, the blade front end 20 comprises a plurality of teeth 56 spaced about the blade length 18, the plurality of teeth 56 facing the front end 40 of the plate 32. Optionally, the plate 32 is located between the plurality of teeth 56 and the top end 14 (i.e., above the plurality of teeth 56 in a generally flat section 70).

Optionally, the slit 52 is generally rectangular in shape. Optionally, the plate width 50 is between about 0.25 inches and about 0.5 inches and the plate length 44 is between about 1.25 inches and about 2 inches. Optionally, the slit 52 has a length 58 generally parallel to the plate length 44 of between about 0.5 inches and about 0.75 inches, and a width 60 generally parallel to the plate width 50 of between about 0.1 and about 0.25 inches. However, it will be understood that the slit 52 dimensions and the plate 32 dimensions are merely exemplary and the plate 32 and the slit 52 can be made to fit different size blades 12.

Optionally, the blade 12 is frictionally attached to the plate 32 via a friction fit, meaning that the length 58 of the slit 52 is approximately equal (e.g., within about 5%) to the width 24 of the blade 12 and the width 60 of the slit 52 is approximately equal (e.g., within about 5%) to the thickness 30 of the blade 12. In other words, no adhesive is preferably used to secure the plate 32 to the blade 12. Preferably, the plate 32 is secured to the blade 12 prior to the blade 12 being attached to the cutting tool 66. Preferably the slit 52 provides a tight fit to the blade 12 allowing the blade 12 its full path of motion.

Optionally, the slit 52 is situated approximately in the widthwise center 64 of the plate 32. Optionally, the slit 52 is offset from the lengthwise center 62 of the plate 32. Optionally, the slit 52 is located between about 0.5 inches and about 1 inch from the front end 40 of the plate 32 and between about 0.1 inches and about 0.5 inches from the rear end 42 of the plate 32, meaning that the blade 12 will be closer to the rear end 42 of the plate 32 than the front end 40 of the plate 32. For example, the slit 52 may be between about 0.25 inches and about 0.75 inches closer to the rear end 42 of the plate 32 than the front end 40 of the plate 32.

Optionally, the blade front end 20 comprises a plurality of teeth 56 spaced about the blade length 18, the plurality of teeth 56 facing the front end 40 of the plate 32. Optionally, the blade 12 is a jigsaw blade with teeth 56 on the front end 40, but not the rear end 22 of the blade 12.

Optionally, the plate thickness 38 is between about 0.001 inches and about 0.01 inches. In other words, preferably, the plate 32 is very thin. Optionally, the blade top end 14 is connected to a motorized cutting tool 66 that includes a motor 68, the motor 68 configured to move the blade 12 upwardly and downwardly in a reciprocating fashion so that the plate 32 acts as a fan to blow debris. Optionally, the upward and downward movement of the blade 12 is configured to cause the plate 32 to bend along the plate length 44. More particularly, without being bound by any particular theory, it is believed that the downstroke of the blade 12 (and attached plate 32) causes the plate 32 to bend or flap in such a manner to move debris from the blade's 12 path during cutting, and the upstroke of the blade 12 (and attached plate 32) produces an upflow of air which also forces debris from the blade's 12 path. The flexible nature of the plate 32 also allows the plate 32 to bend when it contacts the cutting tool 66 on the upstroke. Optionally, plate 32 is comprised of plastic (e.g., polyvinyl chloride, PVC).

Optionally, the blade 12 is configured to cut wood. However, the blade 12 may also be used to cut plastics, metals, laminates or any other materials that produce debris that would accumulate on the cutting surface. Optionally, the upward and downward movement of the plate 32 while cutting a piece of wood is configured to blow sawdust generated by cutting the piece of wood.

Optionally, the plate 32 extends beyond the front end 20, the rear end 22, the left side 26 and the right side 28 of the blade 12.

Optionally, the blade fan system 10 is used in a method that includes: a) providing the blade fan system 10; b) providing a piece of material to be cut (e.g., wood); c) moving the plate 32 and the blade 12 upwardly and downwardly while cutting the piece of material (the blade 12 cuts the material); d) generating debris (e.g., sawdust) during step c); and e) using the upwardly and downwardly movement of the plate 32 to generate a current of air to blow the debris.

The blade 12 and plate 32 may be, for example, packaged together in a kit or sold separately.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A reciprocating tool comprising:
   a) a reciprocating blade configured to cut a substrate and move along a path during cutting, the reciprocating blade having a blade top end, a blade bottom end, a blade length extending from the blade top end to the blade bottom end, a blade front end, a blade rear end, a blade width extending from the blade front end to the blade rear end, the blade width generally perpendicular to the blade length, a blade left side, a blade right side, a blade thickness extending from the blade left side to the blade right side, the blade thickness generally perpendicular to the blade length and the blade width;
   b) a flexible plate removably attached to the reciprocating blade, the flexible plate having a top surface, a bottom surface, a plate thickness extending from the top surface to the bottom surface, the plate thickness generally parallel to the blade length, a plate front end, a plate rear end, a plate length extending from the plate front end to the plate rear end, the plate length generally parallel to the blade width, a plate left side, a plate right side, and a plate width extending from the plate left side to the plate right side, the plate width generally parallel to the blade thickness; and
   c) a motor coupled to the reciprocating blade and configured to move the reciprocating blade and attached flexible plate upwardly and downwardly in a reciprocating fashion,
   wherein moving the flexible plate upwardly and downwardly is configured to cause the flexible plate to bend and blow debris from the reciprocating blade's path during cutting,
   wherein the flexible plate further comprises a slit extending from the plate top surface to the plate bottom surface,
   wherein the slit is located between the plate left side, plate right side, plate front end and plate rear end of the flexible plate,
   and further wherein the reciprocating blade passes through the slit.

2. The reciprocating tool of claim 1, wherein the blade front end comprises a plurality of teeth spaced about the blade length, the plurality of teeth facing the front end of the flexible plate.

3. The reciprocating tool of claim 1, wherein the flexible plate is located between the plurality of teeth and the top end.

4. The reciprocating tool of claim 1, wherein the slit is generally rectangular in shape and further wherein the slit has a length generally parallel to the plate length of between about 0.5 inches and about 0.75 inches and a width generally parallel to the plate width of between about 0.1 and about 0.25 inches.

5. The reciprocating tool of claim 1, wherein the reciprocating blade is frictionally attached to the flexible plate.

6. The reciprocating tool of claim 1, wherein the slit is located between about 0.5 and about 1 inch from the front end of the flexible plate and between about 0.1 inches and about 0.5 inches from the rear end of the flexible plate.

7. The reciprocating tool of claim 6, wherein the blade front end comprises a plurality of teeth spaced about the blade length, the plurality of teeth facing the front end of the flexible plate.

8. The reciprocating tool of claim 1, wherein the plate thickness is between about 0.001 and about 0.01 inches.

9. The reciprocating tool of claim 1, wherein the reciprocating blade is a jigsaw blade.

10. The reciprocating tool of claim 1, wherein the flexible plate is transparent.

11. The reciprocating tool of claim 1, wherein the flexible plate is not attached to any other component of the reciprocating tool other than the reciprocating blade.

12. The reciprocating tool of claim 1, wherein the reciprocating blade is configured to cut wood.

13. The reciprocating tool of claim 12, wherein the upward and downward movement of the reciprocating blade and attached flexible plate in cutting a piece of wood is configured to blow sawdust generated by cutting the piece of wood.

14. The reciprocating tool of claim 1, wherein the flexible plate is comprised of plastic.

15. The reciprocating tool of claim 1, wherein the flexible plate extends beyond the front end, the rear end, the left side and the right side of the reciprocating blade.

16. A method of using a reciprocating tool comprising:
a) providing the reciprocating tool of claim 1;
b) providing a piece of wood;
c) moving the flexible plate and the reciprocating blade upwardly and downwardly while cutting the piece of wood;
d) generating sawdust during step c); and
e) using the upwardly and downwardly movement of the plate to generate a current of air to blow the sawdust.

17. The method of claim 16 wherein the flexible plate is not attached to any other component of the reciprocating tool other than the reciprocating blade.

18. The method of claim 16 wherein the flexible plate is transparent.

19. The method of claim 16 wherein the reciprocating blade is frictionally attached to the flexible plate.

\* \* \* \* \*